(12) United States Patent
Liao

(10) Patent No.: US 8,613,463 B2
(45) Date of Patent: Dec. 24, 2013

(54) FRONT WHEEL FOLDING DEVICE OF GOLF BAG CART

(75) Inventor: Gordon Liao, Tainan (TW)

(73) Assignee: Unique Product & Design Co., Ltd., Tainan (TW)

( * ) Notice: Subject to any disclaimer, the term of this patent is extended or adjusted under 35 U.S.C. 154(b) by 149 days.

(21) Appl. No.: 13/150,302

(22) Filed: Jun. 1, 2011

(65) Prior Publication Data

US 2012/0306182 A1 Dec. 6, 2012

(51) Int. Cl.
*B62B 3/02* (2006.01)
(52) U.S. Cl.
USPC .................. 280/651; 280/655; 280/DIG. 6
(58) Field of Classification Search
USPC ....... 280/638, 639, 651, 654, 655, 62, DIG. 6
See application file for complete search history.

(56) References Cited

U.S. PATENT DOCUMENTS

| 5,611,560 | A | * | 3/1997 | Thimmig | 280/642 |
| 5,743,552 | A | * | 4/1998 | Baechler et al. | 280/642 |
| 6,120,053 | A | * | 9/2000 | DeAngelis | 280/641 |
| 6,152,476 | A | * | 11/2000 | Huang | 280/642 |
| 6,193,263 | B1 | * | 2/2001 | Lin | 280/643 |

* cited by examiner

*Primary Examiner* — Frank Vanaman
(74) *Attorney, Agent, or Firm* — Alan Kamrath; Kamrath IP Lawfirm, P.A.

(57) ABSTRACT

A front wheel folding device of a golf bag cart includes: an upper frame; a lower frame; a support base; a pin coupled to the upper frame and fixed to the lower frame and a wheel axle of two rear wheels; a front wheel frame; and a link rod. The front wheel frame has an end axially coupled to the lower frame and another end having the front wheel. The link rod is pivotally coupled between the upper frame and the front wheel frame. The link rod is linked to fold the upper frame and the lower frame together, and to fold the front wheel and the rear wheels together, to achieve the effect of a simpler and quicker operation.

4 Claims, 9 Drawing Sheets

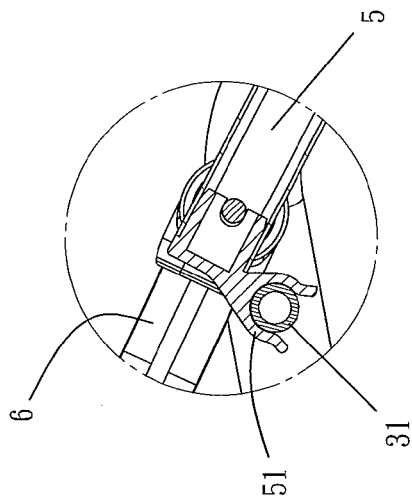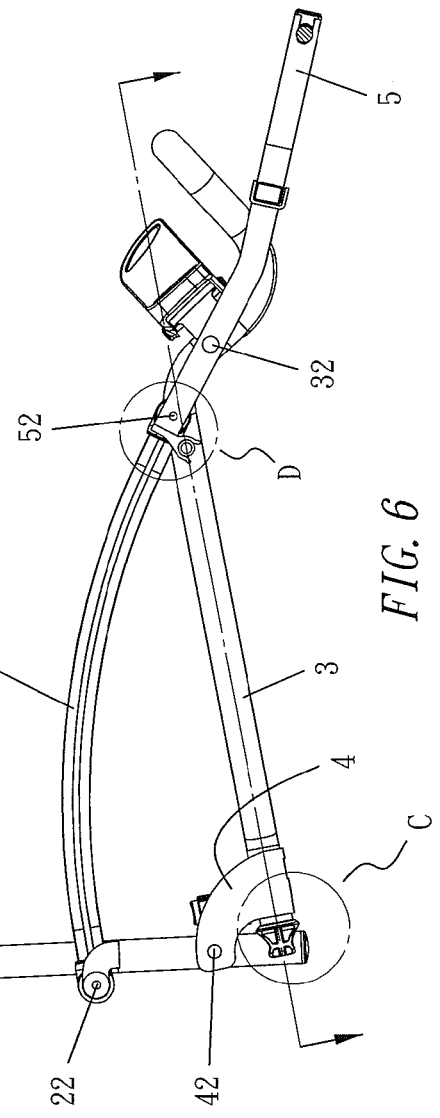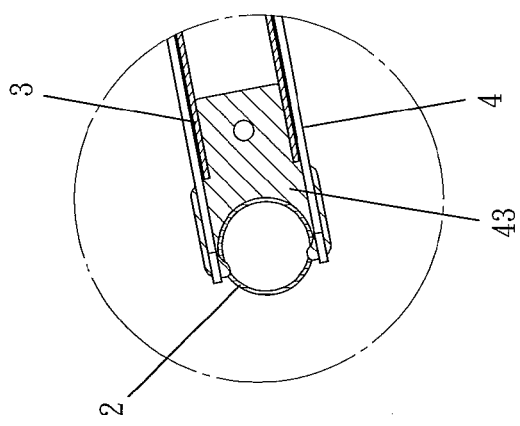

US 8,613,463 B2

FRONT WHEEL FOLDING DEVICE OF GOLF BAG CART

BACKGROUND OF THE INVENTION

1. Field of the Invention

The present invention relates to a front wheel folding device of a golf bag cart and, more particularly, to a front wheel folding device of a golf bag cart that can be operated easily and quickly.

2. Description of the Related Art

In a general conventional front wheel folding device of a golf bag cart as shown in FIGS. 1 to 3, an upper frame 11 is folded forward and then downward towards a lower frame 12. Then, a rotary spindle 13 is provided for folding a front wheel frame 14 and a front wheel 15 backward towards rear wheels 16 to achieve the effect of reducing the packaging volume. However, the aforementioned operation requires a two-step operation and cannot complete folding the golf bag cart by a continuous movement. Obviously, the conventional front wheel folding device of the golf bag cart is inconvenient and requires further improvements.

SUMMARY OF THE INVENTION

Therefore, it is a primary objective of the present invention to overcome the aforementioned drawback of the prior art by providing a front wheel folding device of a golf bag cart that can be folded by one continuous movement to achieve a simpler and quicker operation.

To achieve the foregoing objective, the present invention comprises: an upper frame; a lower frame; a support base; a pin coupled to the upper frame and fixed to the lower frame and a wheel axle of two rear wheels; a front wheel frame; and a link rod. An end of the front wheel frame is axially coupled to the lower frame, and another end has the front wheel. The link rod is pivotally coupled between the upper frame and the front wheel frame. The link rod is linked to fold the upper frame and the lower frame together and also to fold the front wheel and the rear wheels together, to achieve a simpler and quicker operation.

BRIEF DESCRIPTION OF THE DRAWINGS

FIG. 6 is a side view of parts related to a link rod of the present invention;

FIG. 7 is an enlarged view of the portion C of FIG. 6;

FIG. 8 is an enlarged view of the portion D of FIG. 6;

DETAILED DESCRIPTION OF THE PREFERRED EMBODIMENTS

The technical characteristics and effects of the present invention will become apparent with the detailed description of preferred embodiments with related drawings.

Figure 1:
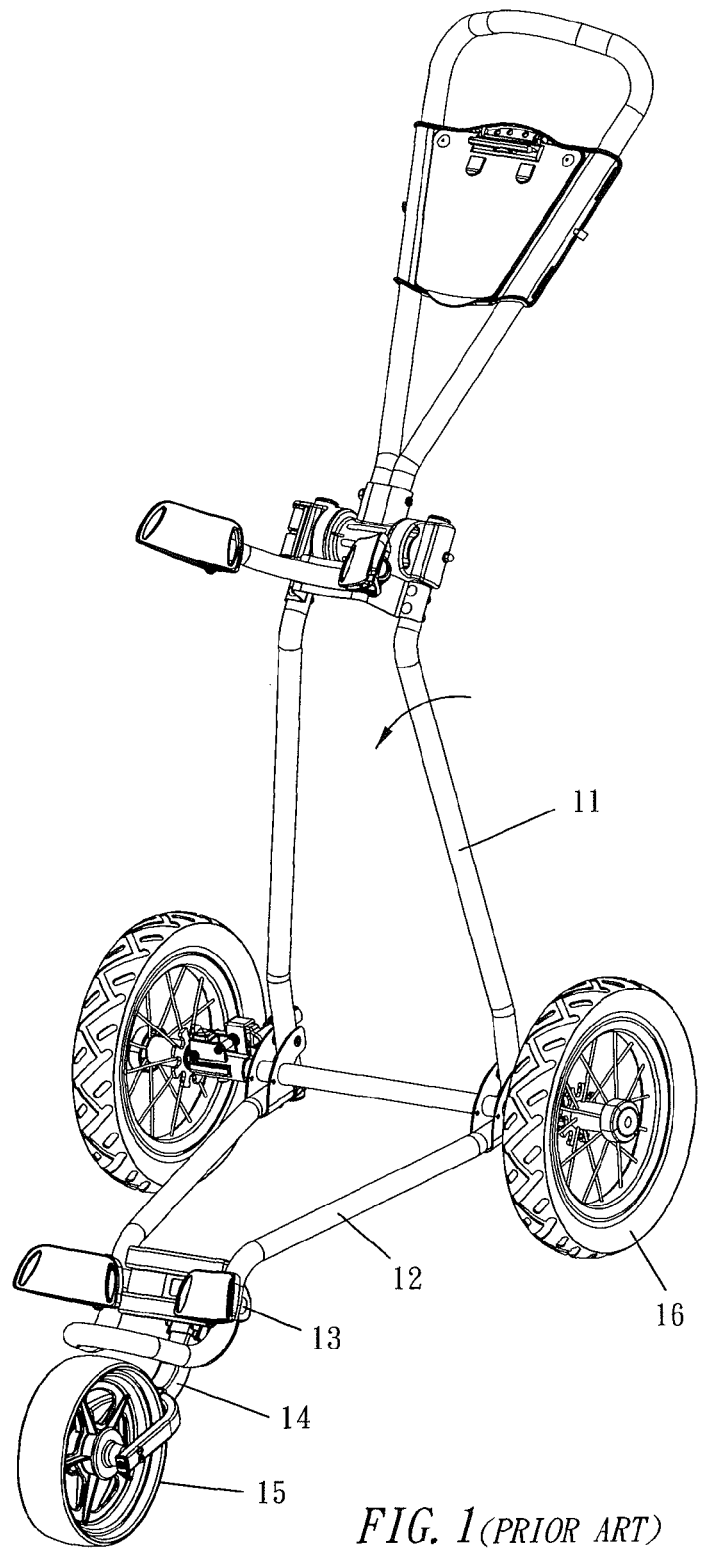
FIG. 1 is a perspective view of a conventional front wheel folding device of a golf bag cart.
Figure 2:
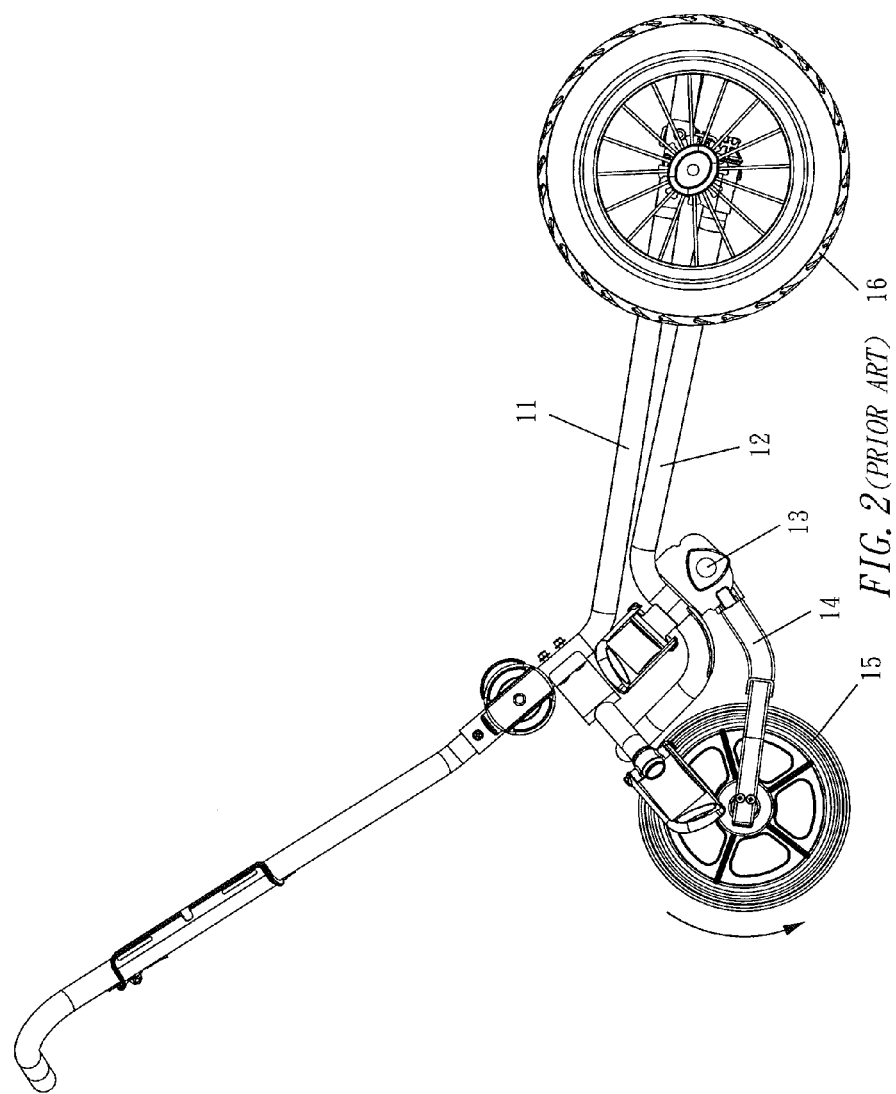
FIG. 2 is a schematic side view of folding a conventional golf bag cart.
Figure 3:
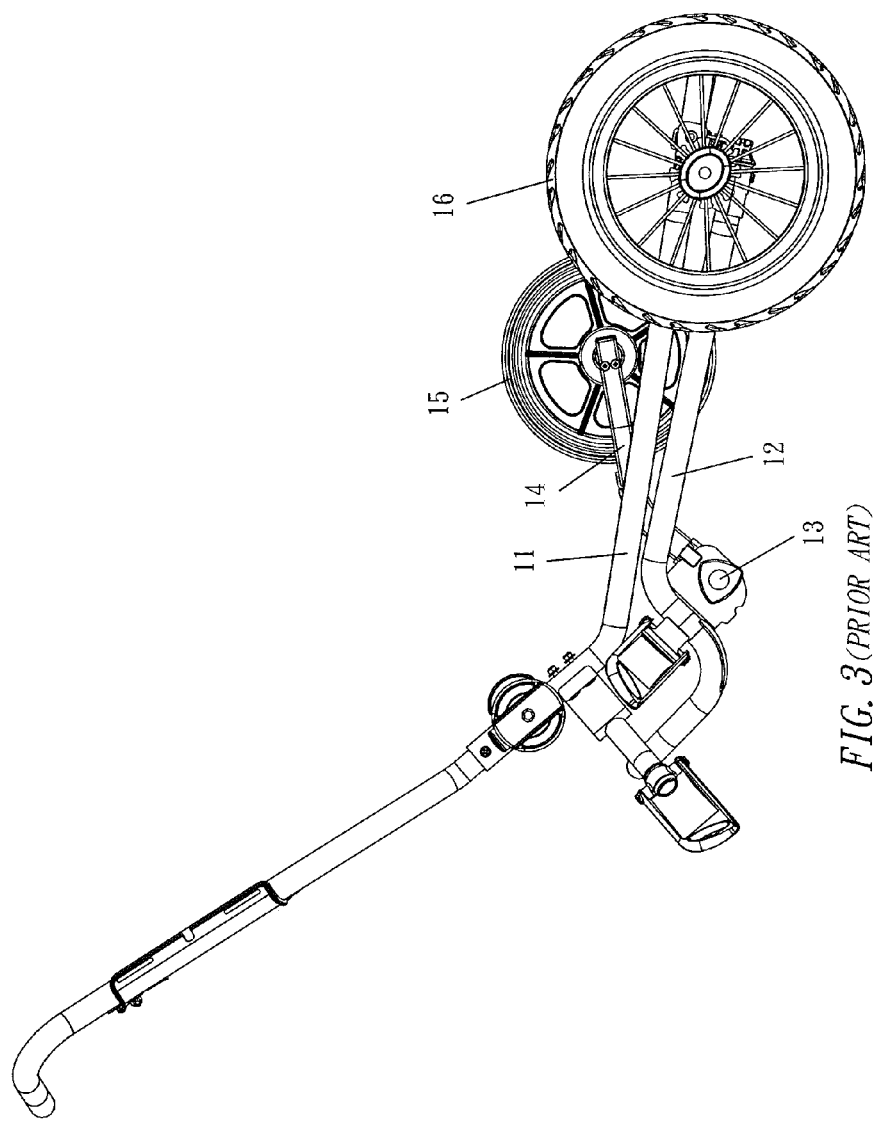
FIG. 3 is a schematic side view of a completely folded conventional golf bag cart.
Figure 4:
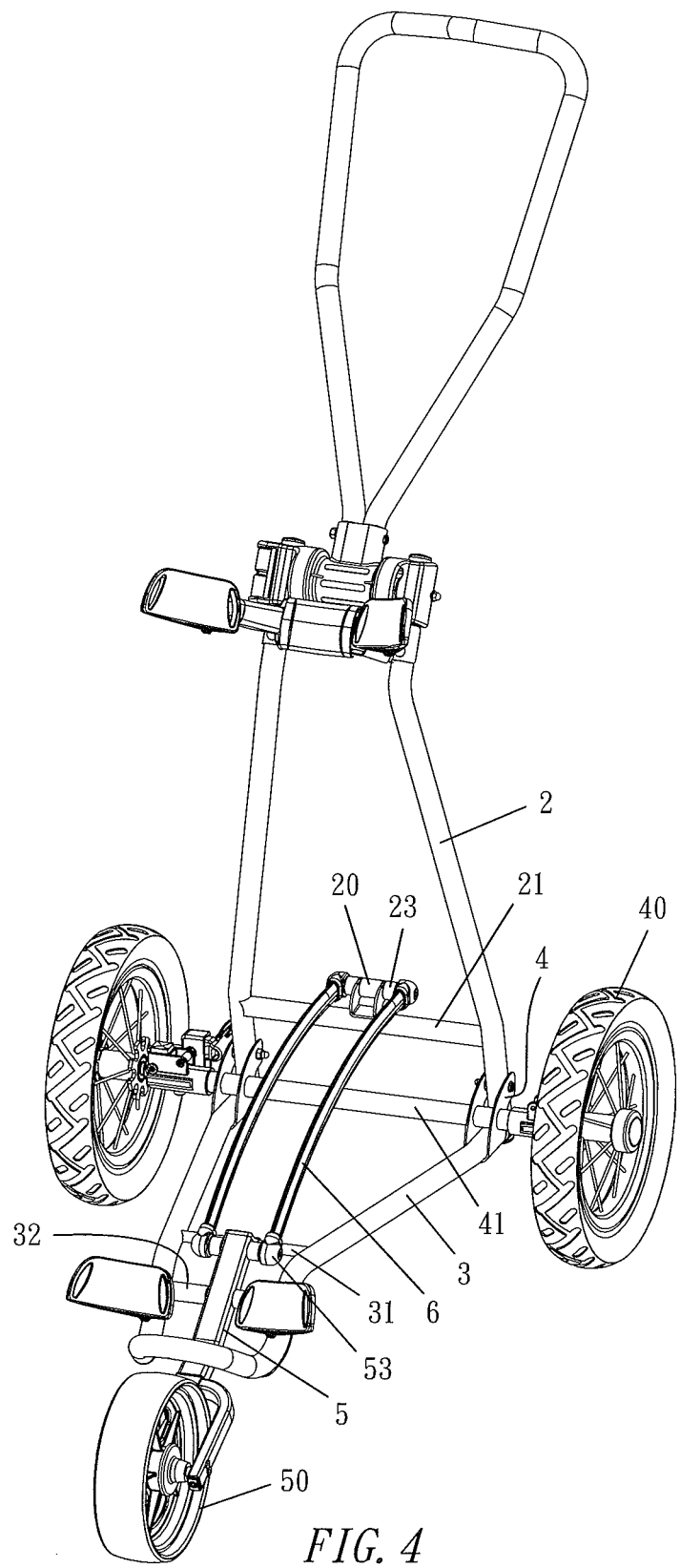
FIG. 4 is a perspective view of the present invention.
Figure 5:
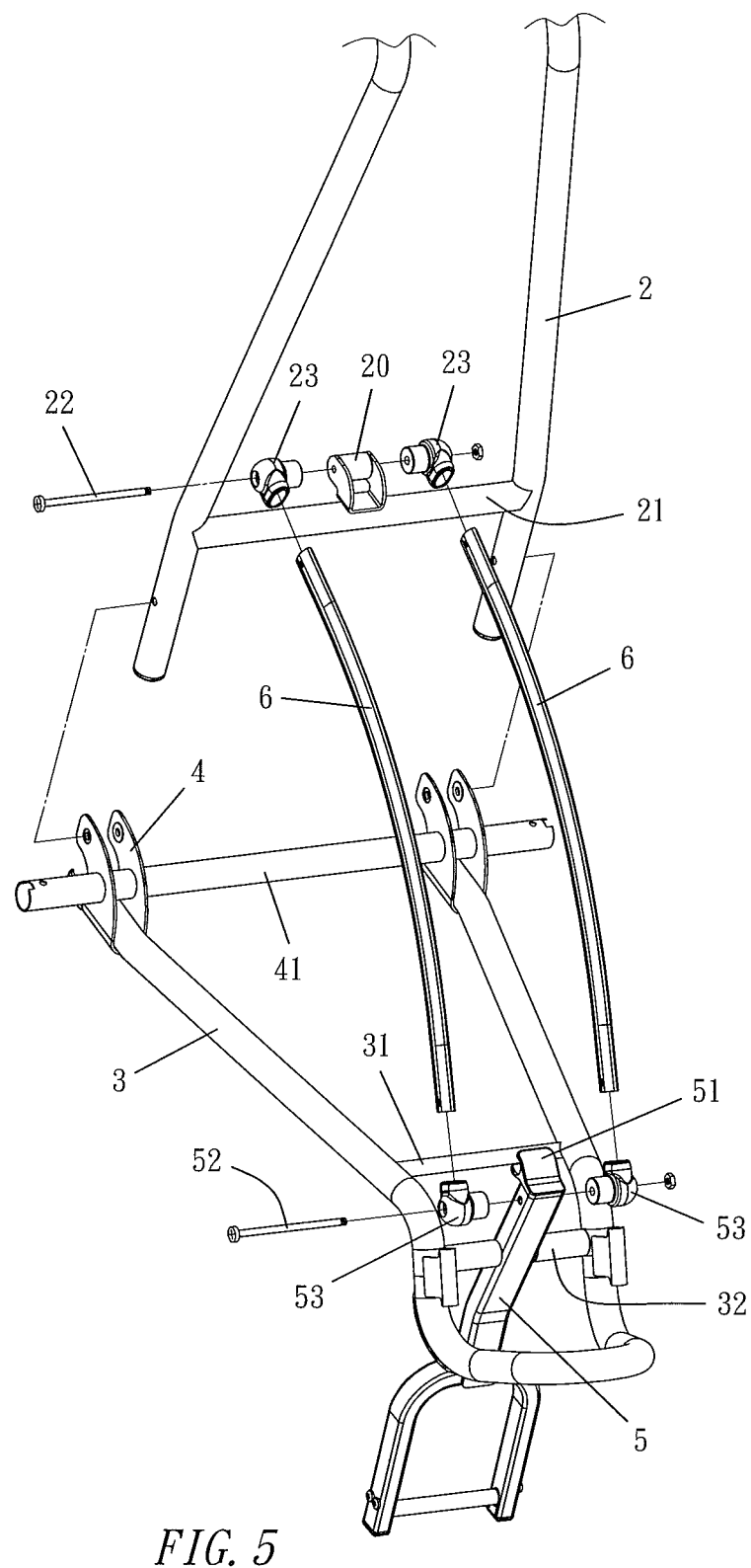
FIG. 5 is an exploded view of parts related to a link rod of the present invention.

With reference to FIGS. 4 to 6, the present invention comprises:

an upper frame 2, having a transverse rod 21 fixed to a lower end of the upper frame 2, for fixing a fixed base 20, and having a joint 23 axially coupled to both sides of the fixed base 20 by a pin 22;

a lower frame 3 with a front end fixed to a rod 31 and a shaft 32;

a support base 4 coupled to the upper and lower frames 2, 3 and a wheel axle 41 of two rear wheels 40 (or the upper end of the support base 4 is axially coupled to the upper frame 2 by a pin 42), with the middle of the support base 4 being provided for passing and fixing the wheel axle 41, with the bottom of the support base 4 being fixed to a rear end of the lower frame 3 and having a clamp 43 for clamping the upper frame 2 as shown in FIG. 7;

a front wheel frame 5 with an end (which is the rear end) axially coupled to the shaft 32 of the lower frame 3 and having a clamp 51 for clamping the rod 31 as shown in FIG. 8, with both sides of the end of the front wheel frame 5 being axially coupled to a joint 53 by a pin 52, and with another end of the front wheel frame having a front wheel 50; and a link rod 6, substantially in a convex arc shape, pivotally and axially coupled between the upper frame 2 and the front wheel frame 5, with both ends of the link rod 6 being coupled to the joints 23, 53 respectively.

Figure 9:
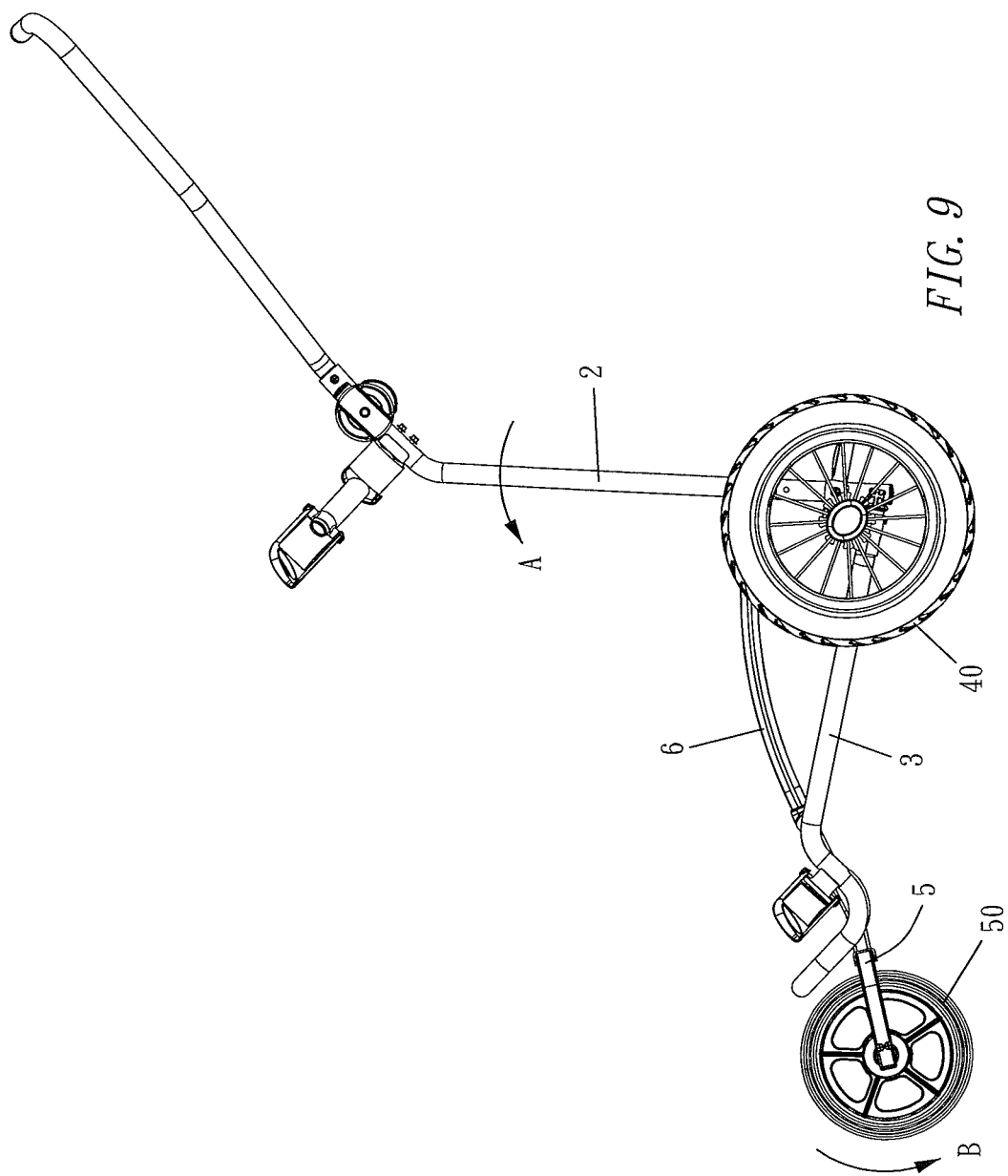
FIG. 9 is a schematic side view of the present invention when fully unfolded.

In the aforementioned structural assembly, when the present invention is unfolded as shown in FIGS. 4, 6 and 9, the link rod 6 is coupled between the upper frame 2 and the front wheel frame 5. The rod 31 (or the lower frame 3) is clamped at the front wheel frame 5 by the clamp 51, and the upper frame 2 is clamped at the support base 4 by the clamp 43. Thus, the upper frame 2, the lower frame 3 and the front wheel 50 are at obtuse angles with respect to each other and unfolded and fixed into positions to prevent the upper frame 2 and the front wheel frame 5 from being loosened or displaced. Now, the frames have pins 22, 42, 52 that serve as pivot points, and the front wheel frame 5 (or the front wheel 50) has a rotating center of the shaft 32. The pins 42 and 52 are intermediate the pin 22 and the shaft 32 in the unfolded position.

Figure 10:
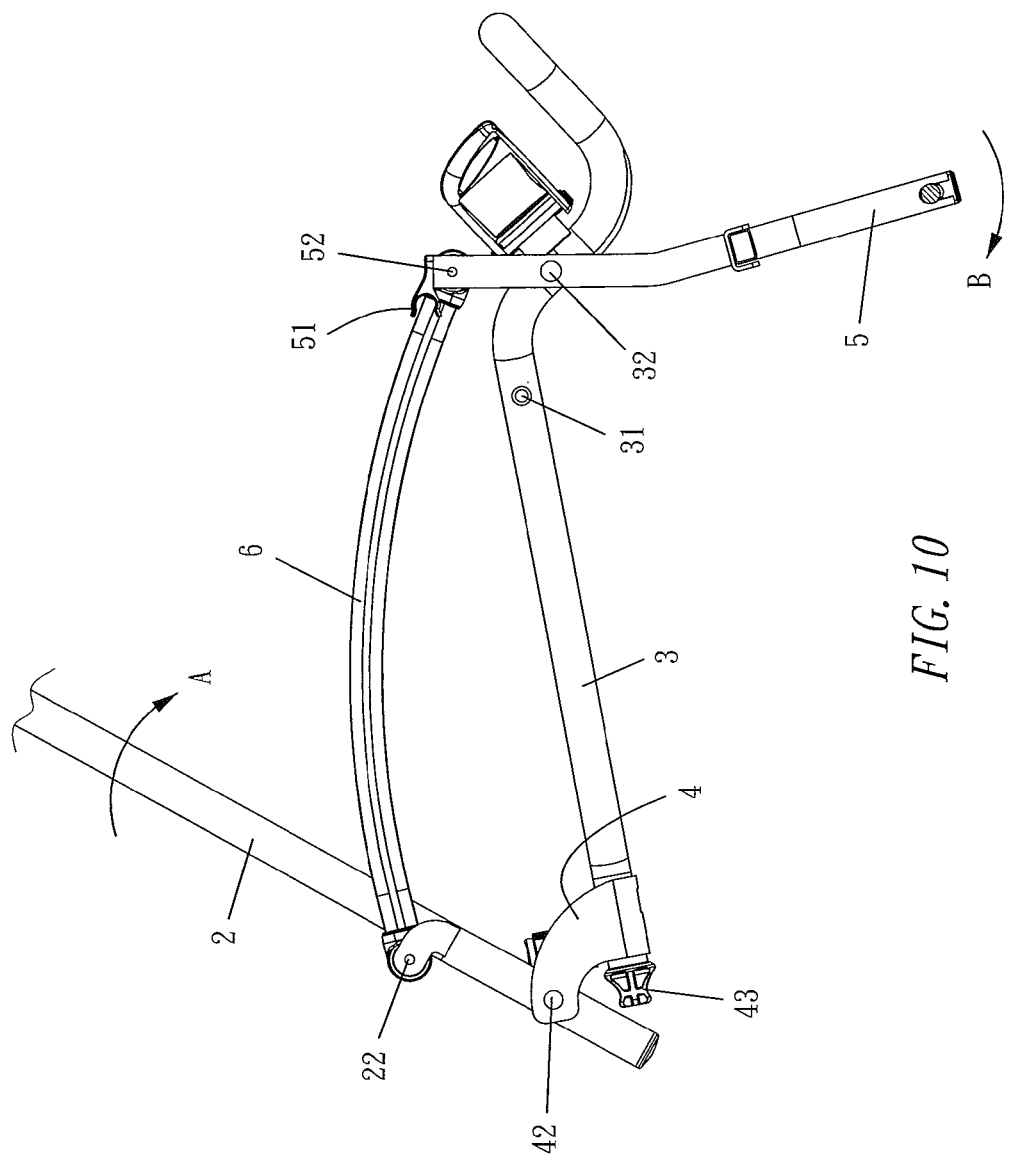
FIG. 10 is a schematic side view of folding movements of the present invention.
Figure 11:
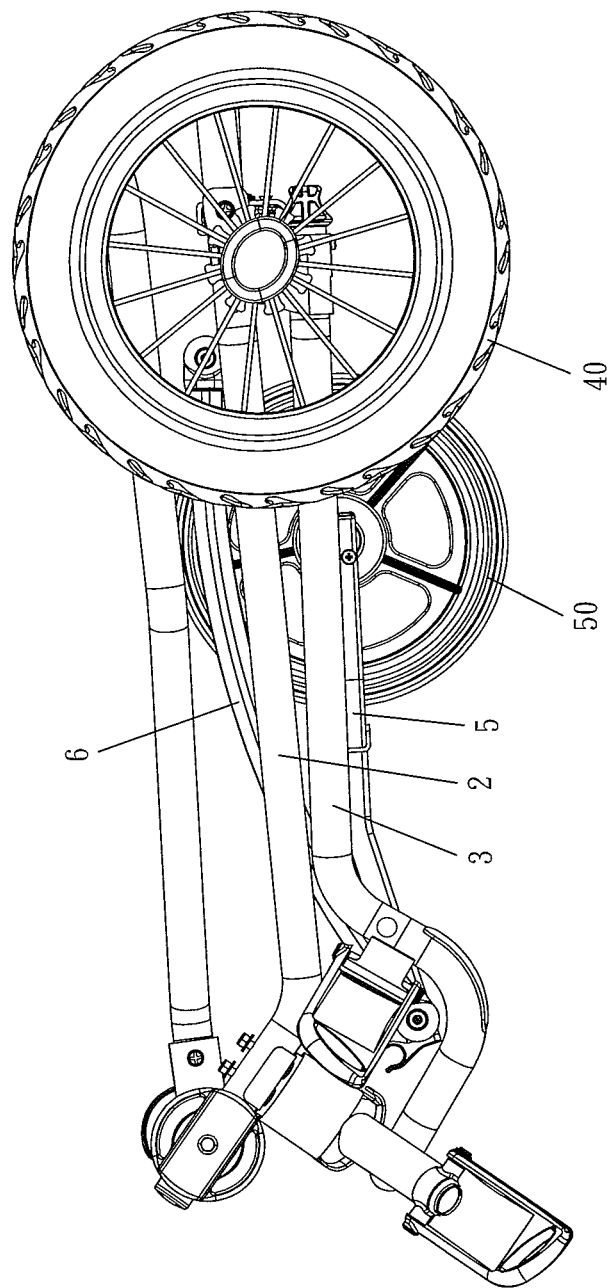
FIG. 11 is a schematic side view of the present invention when completely folded.

When the front wheel folding device of a golf bag cart of the present invention is folded as shown in FIGS. 9 and 10, the upper frame 2 is moved forward and then pushed downward by using the pin 42 as the pivot point. Thus, the upper frame 2 is separated from the clamp 43 (as indicated by the arrowhead A in the figure), while both ends of the link rod 6 can use the pins 22, 52 as pivot points to drive the front wheel frame 5. The front wheel 50 can be moved backward by using the shaft 32 as the rotating center and rotated and folded inwardly, and the clamp 51 is separated from the lower frame (or the rod 31) as indicated by the arrowhead B in the figure. Then, the front wheel 50 and the rear wheels 40 are moved towards each other as shown in FIG. 11. Thus, the upper and lower frames 2 and 3 and the front wheel frame 5 are at acute angles with respect to each other in the folded position, with the shaft 32 and the pin 22 being intermediate the pins 42 and 52 to achieve the effect of reducing the packaging volume and storage space. The present invention can complete folding the golf bag cart by one continuous movement and achieve a simpler and quicker operation.

From the description above, the present invention has the link rod 6 pivotally and axially coupled between the upper frame 2 and the front wheel frame 5. The rod 6 is linked during a folding process to fold the upper frame 2 and the lower frame 3 together and also to fold the front wheel 50 and the two rear wheels 40 together, to achieve the effect of folding the front wheel in one continuous movement. Obviously, the present invention makes the operation easier and quicker and improves over the prior art.

In summation of the description above, the present invention as disclosed in the preferred embodiments achieves the expected objectives and effects.

What is claimed is:

1. A front wheel folding device of a golf bag cart, comprising:
    an upper frame;
    a lower frame;
    a support base pivotally coupled to the upper frame about a first axis, with the support base fixed to the lower frame and a wheel axle of two rear wheels;
    a front wheel frame having an end pivotally coupled to the lower frame about a second axis, with another end of the front wheel frame having a front wheel; and
    a link rod pivotally coupled between the upper frame at a third axis and the front wheel frame at a fourth axis, with the first, second, third and fourth axes being spaced and parallel to each other, with the upper and lower frames and the front wheel frame being pivotal between a folded position and an unfolded position, with the upper and lower frames and the front wheel frame being at obtuse angles with respect to each other in the unfolded position and being at acute angles with respect to each other in the folded position, with the first and fourth axes being intermediate the second and third axes in the unfolded position and the second and third axes being intermediate the first and fourth axes in the folded position.

2. The front wheel folding device of a golf bag cart as recited in claim 1, further comprising a shaft disposed at a front end of the lower frame for pivotally coupling the front wheel frame to the lower frame about the second axis.

3. The front wheel folding device of a golf bag cart as recited in claim 1, further comprising a rod disposed at a front end of the lower frame spaced from the first axis and a clamp disposed on the front wheel frame and releasably engaging the rod.

4. A front wheel folding device of a golf bag cart, comprising:
    an upper frame;
    a lower frame;
    a support base pivotally coupled to the upper frame about a first axis, with the support base fixed to the lower frame and a wheel axle of two rear wheels;
    a front wheel frame having an end pivotally coupled to the lower frame about a second axis, with another end of the front wheel frame having a front wheel; and
    a link rod pivotally coupled between the upper frame at a third axis and the front wheel frame at a fourth axis, with the first, second, third and fourth axes being spaced and parallel to each other, wherein the upper frame includes a transverse rod installed at a lower end of the upper frame, wherein a fixed base is disposed on the transverse rod, wherein a joint is axially coupled to both sides of the fixed base and pivotally connected to the fixed base and defining the third axis, and wherein a joint is axially coupled to both sides of the front wheel frame and pivotally connected to the front wheel frame and defining the fourth axis.

* * * * *